(No Model.)
A. RUTHERFORD & J. RANCH.
HAY RACK.
No. 407,614. Patented July 23, 1889.
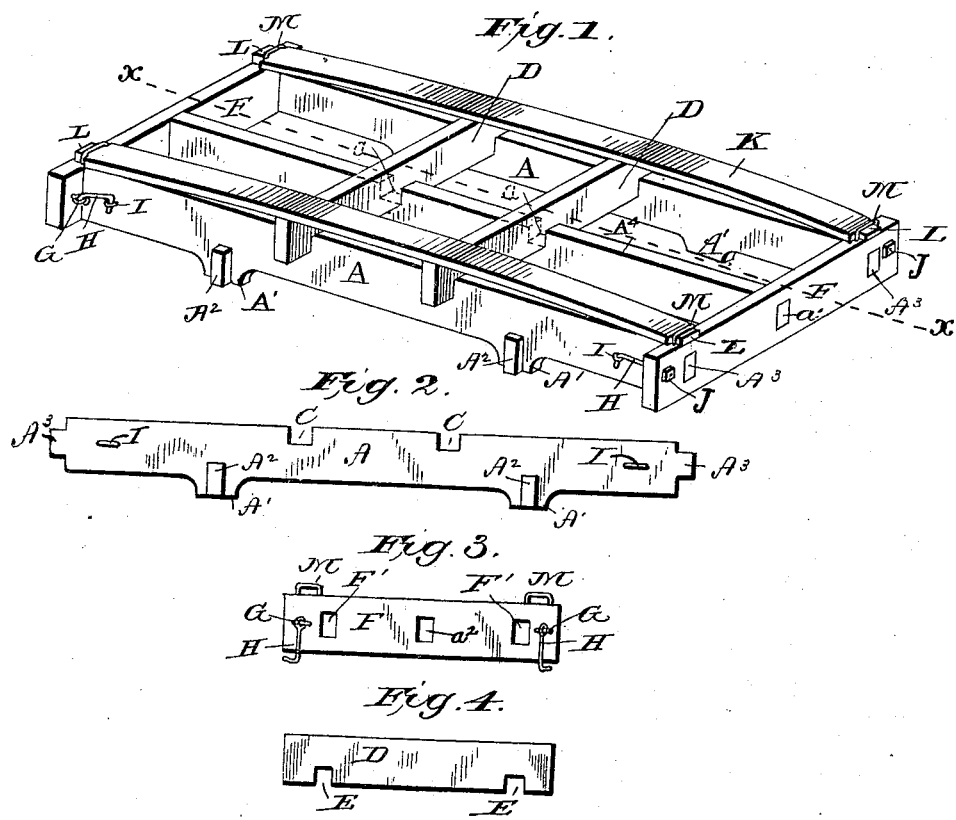
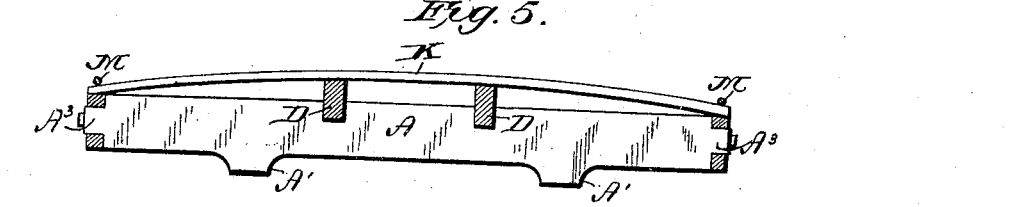
WITNESSES
INVENTOR

UNITED STATES PATENT OFFICE.

ADAM RUTHERFORD AND JERRY RANCH, OF BASIL, OHIO.

HAY-RACK.

SPECIFICATION forming part of Letters Patent No. 407,614, dated July 23, 1889.

Application filed July 17, 1888. Serial No. 280,216. (No model.)

*To all whom it may concern:*

Be it known that we, ADAM RUTHERFORD and JERRY RANCH, both residents of Basil, in the county of Fairfield and State of Ohio, have invented certain new and useful Improvements in Hay-Racks; and we do hereby declare that the following is a full, clear, and exact description of the invention, which will enable others skilled in the art to which it appertains to make and use the same.

This invention relates to hay-racks.

The object is to produce a device which shall be of such construction that it may be readily removed from the running-gear of a wagon and taken apart, so that it will occupy but a small space; furthermore, to produce a device which, when placed upon the running-gear of a wagon, will be held securely in place against lateral and longitudinal displacement, and, finally, to produce a device which shall be simple of construction, efficient and durable in use, and comparatively inexpensive of production; and with these objects in view it consists in the improved construction and arrangement of parts, as hereinafter more fully set forth and described.

In the accompanying drawings, forming part of this specification, and in which like letters of reference denote corresponding parts in the several views, Figure 1 is a perspective view of the improved hay-rack. Fig. 2 is a front view of one of the side pieces removed. Fig. 3 is a similar view of one of the end pieces. Fig. 4 is a like view of one of the cross-pieces; and Fig. 5 is a longitudinal sectional view taken on the line $x$ $x$ of Fig. 1, showing more particularly the manner of securing the strengthening-brace in position.

In the accompanying drawings, the letter A designates the side pieces, the upper edges of which are slotted, as shown at C, to receive the slotted ends of the cross-pieces D, which slots are shown at E. The lower edges of the side pieces are provided with downwardly-projecting bearing-extensions A', which rest upon the bolsters of the running-gear of the vehicle upon which the rack is placed. Secured to the outer sides of these side pieces at these extensions are vertical blocks $A^2$, the inner edges of which are adapted to bear against the standards of the vehicle, which will thus prevent the device from slipping off the wagon. The ends of the side pieces are reduced to form the projections $A^3$, upon which the end pieces F, having openings F', are secured. Eyebolts G are secured in the ends of the end pieces, and have working upon their outwardly-projecting screw-threaded ends tightening-nuts J. To the inner eyed ends of these bolts are secured the hooks H, which are attached with their hooked ends to staples or eyebolts I in the sides of the side pieces. Thus it will be seen that after the hooks have been attached to the staples or eyebolts in the sides of the side pieces and the tightening-nuts screwed home, drawing the eyebolts G and their hooks with them, it will prevent the end pieces from working off the reduced ends of the side pieces.

When it is desired to take the device apart, the end pieces may be moved from the side pieces by simply loosening the tightening-nuts and unhooking the hooks.

K indicates the longitudinal top pieces, which are placed upon the upper edges of the cross-pieces and the end pieces, and secured to the latter by means of the reduced ends (shown at L) being inserted through the keepers M, permanently secured in the upper edges of the end pieces. Thereby the cross-pieces D are prevented from being accidentally vertically displaced, as well as longitudinally and laterally, as hereinbefore stated.

In order to strengthen the device additionally a longitudinal brace $A^4$ is used. The upper edge of this brace is provided with open-ended slots $a$, in which the cross-pieces D fit, and the ends are reduced to form tenons $a'$, which fit in mortises $a^2$ in the end pieces F.

When in use, the ladders are secured at each end of the frame in the usual and well-known manner. Therefore, an illustration of the same is not deemed necessary.

From the foregoing description, taken in connection with the accompanying drawings, the operation, advantages, and construction of the same will be readily understood without requiring an extended explanation.

Having thus described our invention, we claim and desire to secure by Letters Patent of the United States—

1. In a hay-rack, the combination of the side pieces formed with open-ended slots in their upper edges and with reduced ends, the cross-pieces formed with open-ended slots in their lower edge to receive the slots in the side pieces, the end pieces formed with openings to receive the reduced ends of the side pieces and removably secured to the ends of the said side pieces, longitudinal top pieces, and keepers secured to the upper edge of the said end pieces to receive the ends of the longitudinal top pieces, substantially as described.

2. In a hay-rack, the combination of the side pieces formed with open-ended slots in their upper edges and with reduced ends, the cross-pieces formed with open-ended slots in their lower edge to receive the slots in the side pieces, the end pieces formed with openings to receive the reduced ends of the side pieces, longitudinal top pieces, keepers secured to the upper edge of the said end pieces to receive the ends of the longitudinal top pieces, and a longitudinal brace provided with open-ended slots to receive the cross-pieces and with reduced ends to engage openings in the end pieces, substantially as and for the purpose specified.

3. In a hay-rack, the combination of the end pieces, the side pieces provided with slots and having their ends connected to said end pieces, the cross-pieces fitting in the slots of the side pieces, and the longitudinal top pieces having their ends secured to the said end pieces and serving to retain the cross-pieces in place, substantially as described.

In testimony that we claim the foregoing as our own we have hereunto affixed our signatures in presence of two witnesses.

ADAM RUTHERFORD.
JERRY RANCH.

Witnesses:
  GEORGE CUNNINGHAM,
  ALBERT L. HEISTER.